A. H. C. GIBSON.
SELF PROPELLED VEHICLE.
APPLICATION FILED JULY 26, 1913. RENEWED SEPT. 28, 1915.
1,192,514.
Patented July 25, 1916.
2 SHEETS—SHEET 1.
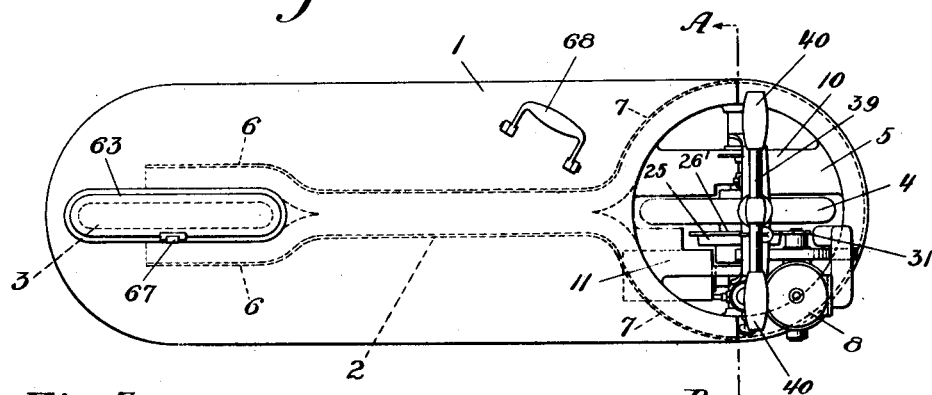
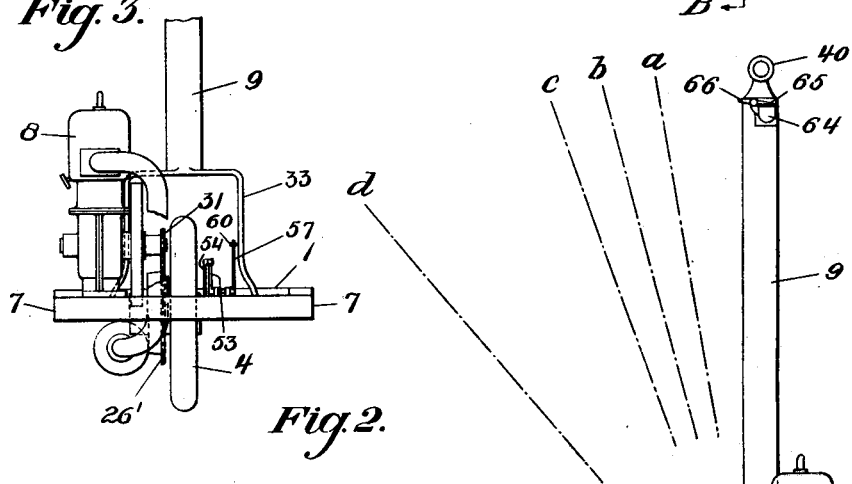
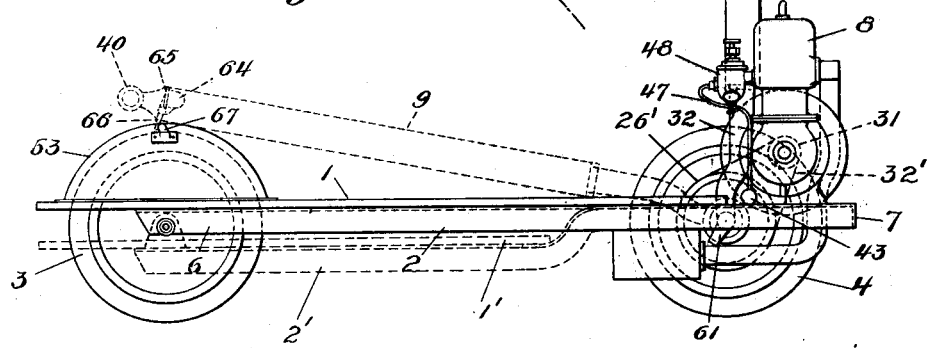
Witnesses:
John Darby
H. Muchmore
Arthur Hugo Cecil Gibson.
Inventor
By his Attorney A. H. C. GIBSON.
SELF PROPELLED VEHICLE.
APPLICATION FILED JULY 26, 1913. RENEWED SEPT. 28, 1915.
1,192,514.
Patented July 25, 1916.
2 SHEETS—SHEET 2.
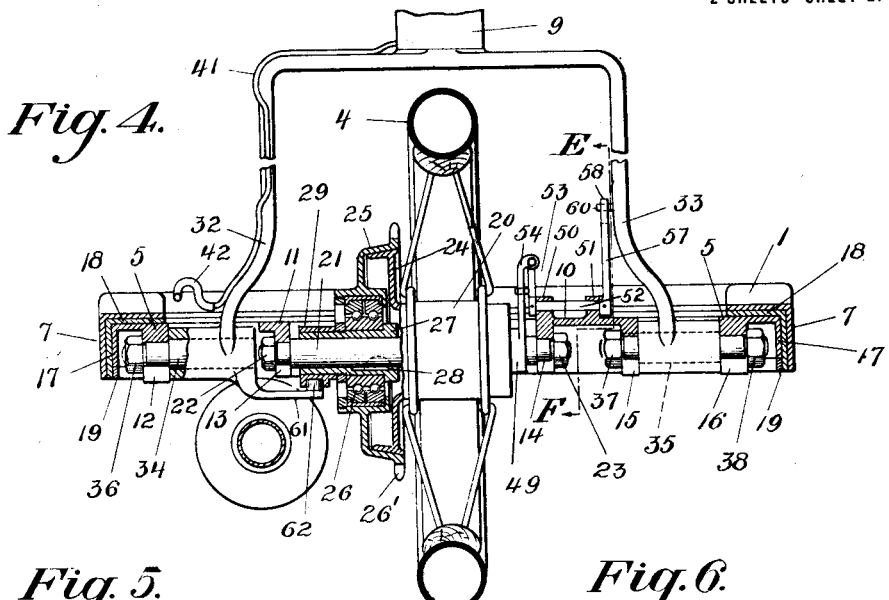
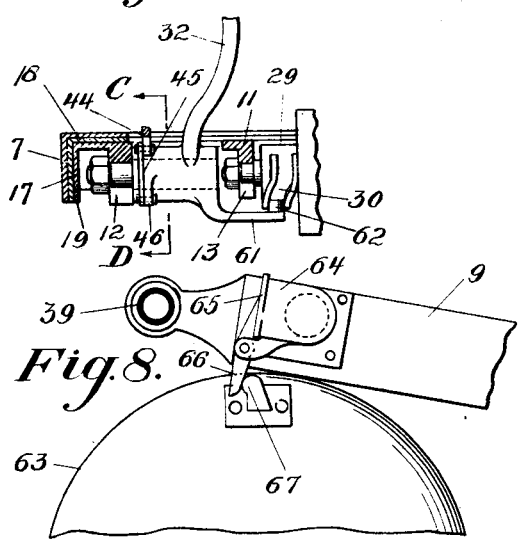
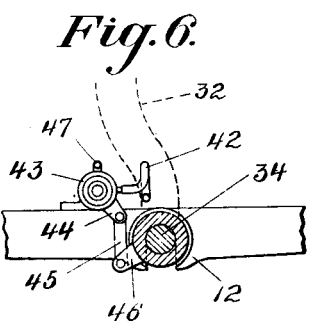
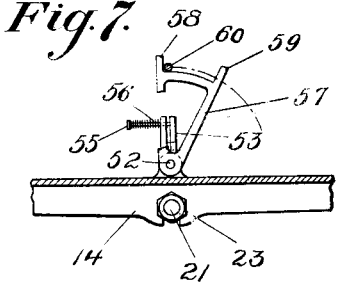
Arthur Hugo Cecil Gibson.
Inventor

UNITED STATES PATENT OFFICE.

ARTHUR HUGO CECIL GIBSON, OF NEW YORK, N. Y., ASSIGNOR TO AUTO-PED COMPANY OF AMERICA, A CORPORATION OF DELAWARE.

SELF-PROPELLED VEHICLE.

1,192,514.     Specification of Letters Patent.     Patented July 25, 1916.

Application filed July 26, 1913, Serial No. 781,297. Renewed September 28, 1915. Serial No. 53,158.

*To all whom it may concern:*

Be it known that I, ARTHUR HUGO CECIL GIBSON, a subject of the King of Great Britain, and a resident of New York city, county and State of New York, have invented certain new and useful Improvements in Self-Propelled Vehicles, of which the following is a specification, reference being had to the drawings herein referred to, which are made a part hereof.

My invention relates to self-propelled vehicles and more especially to a class, not as yet in use, intended primarily for the auto transportation of a single person by means of a structure far more compact, light and simple than anything now or heretofore made, and which, however, may be utilized by more than one person as will hereinafter appear.

The objects of my invention are to produce a vehicle which will be extremely small, compact, and light in comparison to the load to be carried, and will be sufficiently powerful to offer adequate means for quick locomotion under ordinary conditions and relatively extreme economy in use and operation. It is well known that automobiles intended for several persons are to a very large extent used by one person under which condition a vehicle of large weight, bulk and large initial cost and cost of operation, serves to transport a person or goods representing a very small fraction of its own weight and bulk.

With the development of self-propelled bicycles, the person or persons transported represent a much larger percentage of the weight and in some cases may equal the weight of the vehicle. Whereas among the objects of my invention is the production of a self-propelled structure well adapted for transportation of a load far in excess of its own weight, thereby effecting economy in initial cost and operation beyond any auto transportation means heretofore available.

The invention consists in the arrangement and construction of parts and combination of the various elements, producing results as already mentioned or as will hereinafter appear.

As an illustration of the results obtainable by my invention, I make a vehicle weighing less than fifty pounds capable of efficient transportation of a person of one hundred and fifty pounds, and more; while the compactness of the structure permits its being carried by the rider when not in use, as conveniently as he would carry a hand satchel.

In the accompanying drawings are represented various views and parts as a specific form of embodiment of my invention.

Figure 1 is a plan view of the vehicle; Fig. 2 is a side elevation; Fig. 3 is a front elevation; Fig. 4 is a vertical section through the front wheel as shown at A—B, Fig. 1, drawn to twice the scale; Fig. 5 is a detail of clutch operating construction; Fig. 6 is a sectional view at line C—D of Fig. 5 to show gasolene supply control; Fig. 7 is a sectional view at E—F, Fig. 4, to show the brake control connections; Fig. 8 is a fragmentary side elevation showing the end of the steering and control handle.

In these drawings, the vehicle, which in some forms I call an "autoped," embodies a platform 1, carried by frame 2, supported on two wheels 3—4, which, as shown, are tandem. The rear wheel 3 is supported on bearings rigidly carried on the fork 6—6 of the frame 2; the axle of the forward wheel 4 is carried in a frame 5 rotatable on suitable annular bearings 7—7 formed in the frame 2, so that this wheel 4 may be turned to effect steering. The motor 8 with its controlling devices are supported to move with the rotatable or steering frame, to which is also connected the steering and control handle 9.

The platform 1 may be made of any suitable material such as laminated wood or sheet metal, and while I have shown the frame 2 formed of angle or channel section, both frame and platform may be made of one piece formed or stamped to meet all the requirements of the structure. The rotatable frame 5 is provided with suitable cross members 10—11 with depending web members 12—13—14—15—16 adapted for the support of the motor 8 and the various other operating parts; suitable bearing surfaces are provided circumferentially on the upper side of the annular portion 5 and between the outer face of the depending flange 17 and the bearing frame member 7; an anti-friction ring 18 is shown interposed between these bearing surfaces, while a retaining ring 19 is fastened to the inner face of the depending flange to prevent displacement of member 5.

The forward or driving wheel 4, with its hub 20, is rotatably mounted, in any well-known manner on an axis or shaft 21, said shaft being removably held in slots of webs 13 and 14 by suitable clamping nuts 22, 23. Fastened to or integral with hub 20 is one member 24 of the driving clutch 25, said driving clutch 25 being mounted on the ball bearing 26, the inner race of which is fixed against rotation on the sleeve 27 which is slidably supported on shaft 21 and secured against rotation on said shaft by key 28. Fixed to the outer end of sleeve 27 is a ring 29 provided with a cam groove 30.

Means for propelling the autoped are provided in the motor 8, through its sprocket 31, chain 32', and sprocket 26' of clutch member 25, the motor 8 being suitably secured to the rotatable frame member 5 in fixed relation to the driving wheel 4.

Stearing and controlling means are also provided, comprising in the present embodiment the yoke members 32, 33 pivotally supported on pins or short shafts 34 and 35 removably secured in slots of webs 12, 15 and 16 by the clamping nuts 36, 37 and 38, the axes of said short shafts coinciding with the axis of shaft 21 of driving wheel 4. The yoke members 32 and 33 straddle the driving wheel 4 with its clutch and brake members, and combine to support the upwardly extending steering handle 9, provided at its upper end with a cross-bar 39 and grip handles 40, 40.

The steering handle 9, made of tubing, forms the gasolene tank or supply reservoir for the motor 8. A pipe 41, secured in any suitable manner to the yoke member 32, conveys gasolene from the supply reservoir to the cutoff valve 43, a flexible tube 42 being interposed between the lower end of pipe 41 and said valve. As disclosed, the cutoff valve consists of a two-way cock provided with an operating lever 44 connected by a link 45 to a lever or projection 46 carried by the bearing hub of the yoke member 32. A tube 47 conveys gasolene from the cutoff valve 43 to the carbureter 48.

Means for retarding or stopping the travel of the autoped are provided by the brake 49, which may be of any of the wellknown forms. Its method of control, however, is of novel construction.

Referring to Figs. 4 and 7, bearings 50 and 51 formed on member 10, support a shaft 52, the axis of which is in a vertical plane passing through the axis of shaft 21. The inner or wheel end of said shaft 52 carries an upwardly extending arm 53 connected to the brake arm 54 by a yielding connection comprising the headed rod 55 passing through an aperture in arm 54 and the compression spring 56 interposed between said arm and head of said rod. Mounted at the outer end of shaft 52 is the quadrant shaped lever 57, with the upwardly projecting lugs 58 and 59 designed to be engaged by a pin 60 carried by the yoke arm 33. Extending inwardly from the under side of the bearing on the yoke arm 32, is an arm 61 supporting at its outer end a roller 62 engaging the cam slot 30 of ring 29 on sleeve 27. The motor 8 is provided with suitable exhaust pipe and muffler, as shown, and also with suitable sparking and ignition timing devices, not shown, which latter may be controlled in any well known manner, such, for example, as by suitable wires connected to the grip handles 40, 40. A metal mud guard 63 is provided for the rear wheel 3 and a similar one, not shown, may be provided for the driving wheel 4 and its associated parts. A combined supply inlet and vent for the gasolene reservoir 9 is provided in the cup 64 with cover 65 and closing lever 66, said lever being designed to engage the cam piece 67 supported on the wheel guard 63, when the steering handle 9 is in its reclined or folded position. A handle 68 attached to the platform 1 provides means for carrying the structure.

From the foregoing it will be seen the operation is as follows: The operator or rider raises the articulated stabilizing and steering handle 9 to a substantially vertical position, holding the structure with its two wheels erect and with the steering handle in this position the brake is released and the clutch will be thrown into operation, connecting the motor with the driving wheel and at the same time establishing the flow of gasolene from the supply tank through suitable valves as described to the engine. Suitable electrical connections from the batteries, not shown, being made through the timing device to the spark plug, the machine may now be started by pushing the vehicle forward which turns the engine, sucking in a charge, and with the ignition effects the starting of the motor. As the autoped gathers headway, the operator steps on the platform with the hands on the grip handles 40. In his uprigh position, the length of handle is such as to make the grips suitable in position for readily steering the vehicle by rotating the frame 5 by means of handle 9, and the control of the motor, clutch, fuel supply and brake is then effected by the inclination of the steering handle 9.

In Fig. 2 the several broken lines *a*, *b*, *c*, *d* show different positions of the axis of the steering handle, which are as follows: from the vertical position to the position as indicated by broke. ine *a*, all driving parts are in full operative engagement.—between the positions of the steering handle as shown in broken lines *a* and *b*, the clutch is released due to the action of the roller 62 in cam slot 30 of the ring 29 on the sleeve 27, carrying clutch member 25;—between the positions of the handle as indicated by broken lines b and c the motor is running free:— when the position of the steering handle passes the broken line c the gasolene supply has been cut off by valve 43, and then the pin 60 engages the lug 59 of the segment 57, causing application of the brake, and through its flexible connection with arm 53 the braking is gradually effected while the steering handle 9 moves toward the position shown by the broken line d, at which time the gasolene is also effectually cut off. As shown in the folded position, that is when the handle 9 is so reclined as to reach the mud guard of the rear wheel, the lever 66 at its end engages the cam 67, forcing the cover 65 on its seat and effectually seals the cup against leakage of gasolene from the supply tank.

As indicated in Fig. 2, there are broken lines showing a modified arrangement of the platform consisting of a drop of the frame such as 2' a short distance behind the front wheel, which brings the platform such as 1' on which the rider stands to a level below the axes of the wheels. For stability in some forms of construction I prefer to bring the platform below the center of the wheels, and I may also arrange other parts so that the center of gravity of the structure, aside from the movable handle, will be below the center of the wheels. In cases where the wheels are of large diameter for fast running, I prefer the low frame, in order that the platform may be as near the ground as possible. In such case the muffler and other mechanism will be arranged differently to prevent injury by colliding with obstacles on the road, or damage when the vehicle is inclined or lists going around curves. In some forms I may add steadying wheels similar to such as already suggested for two-wheeled vehicles, but I find that for simplicity and the many advantages inherent in the practical embodiment of my invention, such and other adjuncts are usually superfluous.

I have already designed a modification intended to further minimize the weight of my vehicle, in which tubular construction is used in the frame, and also I design the engine so that it forms integrally the frame work between the platform and the driving wheel support, and in this arrangement bring the crank-shaft of the engine coincident with the axis of the driving wheel and by suitable gearing rotate the driving wheel substantially as a rim around the transmission or reduction gearing,—all of which adds to the compactness and lightness of the vehicle.

Many modifications have been considered in design of different parts and in their arrangement, and it will be understood that such can be made without departing from the spirit of my invention,—a seat may be added and the platform or frame or body may be variously designed without detracting from the advantages of my invention. In cases of necessity an additional wheel may be added as, for instance, slow speed and more stability while the structure will still embody many features of my invention.

Having due regard for the many changes that may be made from the specific form in which I have illustrated my invention, what I claim and desire to secure by Letters Patent is:

1. In combination, in a self-propelled vehicle having two road wheels in tandem, a platform frame extending between said wheels and adapted to carry a person standing thereon, a motor, means for connecting the motor to one of said wheels to rotate the latter for propelling the vehicle, and controlling means having an articulated stabilizing handle member extending to a position in which a person mounted on said platform may control the same, and a connection from said stabilizing member for controlling the application of the motive power by movement of said stabilizing member on its articulation.

2. In a self-propelled vehicle, a plurality of road wheels including front and rear wheels, a platform frame extending between the front and rear wheels, a motor for one of said wheels forming a driving wheel, means including a clutch for connecting the motor with the driving wheel, steering means connected with the driving wheel and including an articulated upwardly extending operating handle, and connections whereby the movement of the articulated handle in one plane is adapted to control the clutch and the movement of said handle in another plane is adapted to effect the steering of the driving wheel.

3. In a self-propelled vehicle, the combination of a plurality of road wheels including front and rear wheels, a platform frame extending between the front and rear wheels and adapted to carry a person standing on the platform, a steering wheel frame rotative in the forward end of the platform frame and in which one of said road wheels constituting a steering wheel is mounted, an upwardly extending combined steering and controlling bar pivotally attached to the steering wheel frame and extending into position accessible to the occupant for turning the steering wheel frame to steer the vehicle, said bar being adapted to be rocked on its pivot to different degrees of inclination to control the power transmitted by a motor to a driving wheel, a motor mounted on the steering frame in conjunction with the steering wheel, and driving connections from the motor to the steering wheel including a clutch controlled by said bar.

4. In a self-propelled vehicle having a plurality of road wheels one of which is a steering wheel, a motor mounted to partake of the steering movement of the steering wheel and adapted to be connected thereto, an upwardly extending articulated bar adapted to steer the steering wheel and to be moved on its articulation to different positions of inclination, a brake for said steering and driving wheel, and connections between said bar and the brake so that the movement of said bar on its articulation operates the brake.

5. In a self-propelled vehicle, two road wheels in tandem, a platform frame extending between said wheels and adapted to carry a person standing thereon, a motor, driving connections therefor with one of said wheels including a clutch, an articulated upright having rigid stabilizing connections, and means for controlling the clutch by movement of said upright on its articulation.

6. In a self-propelled vehicle, two road wheels in tandem, a carrying platform connecting said wheels in close proximity to the plane of rolling contact of said wheels, means for steering the front wheel including an upwardly extending steering handle, a motor, driving connections for the motor with said steering wheel, and rigid connections for the steering handle in a plane transverse to the steering wheel so that said handle serves as a stabilizing member under the control of the operator.

7. In combination, in a self-propelled vehicle, two road wheels in tandem of a relatively small diameter, a carrying platform connecting said wheels in close proximity to the plane of rolling contact of said wheels, means for steering the front wheel including an articulated upwardly extending steering and stabilizing bar, a motor, and driving connections for the motor with the steering wheel including a clutch, the upwardly extending stabilizing bar being rigid in one plane with respect to the steering wheel and movable in other planes on its articulation to effect the control of the clutch.

8. In a self-propelled vehicle, two road wheels in tandem, a platform connecting said wheels in close proximity to the plane of rolling contact of said wheels, driving and steering connections for the forward wheel, a brake for the vehicle, an upwardly extending stabilizing and control bar located so as to be operated by the occupant of the vehicle and mounted for angular movement in a vertical plane, and connections between said bar and the brake so that angular movement of said bar in a vertical plane will operate the brake.

9. In a self-propelled vehicle having two road wheels in tandem, a platform supported by the wheels, an articulated stabilizing and control bar extending from the forward wheel and including a full tank, a motor associated with the forward wheel, driving connections for connecting the motor to the forward wheel, and fuel supplying connections from the fuel tank to the motor controlled by the movement of said bar on its articulation toward said platform to control the flow of fuel to the motor.

10. In a self-propelled vehicle having two road wheels in tandem, a platform supported by the wheels, an articulated stabilizing and control bar extending from the forward wheel and including a full tank, a motor associated with the forward wheel, driving connections for connecting the motor to the forward wheel, and fuel supplying connections from the fuel tank to the motor controlled by said bar so that movement of said bar on its articulation to a position adjacent to said platform will cut off the flow of fuel to the motor.

11. In a self-propelled vehicle having two road wheels in tandem, a stabilizing and control bar extending from the forward wheel and foldable away from stabilizing position into a position adjacent to the rear wheel and including a fuel tank for the motor provided with a vent, a motor associated with the forward wheel, driving connections for connecting the motor to the forward wheel, a closure for said full tank vent, and means adjacent to the rear wheel for forcing the closure on its seat to seal the vent when said bar is folded away from its stabilizing position.

12. In a self-propelled vehicle having two road wheels in tandem, a stabilizing and control bar pivotally supported on an axis in line with the axis of the forward wheel, a motor associated with the forward wheel, driving connections including a clutch for connecting the motor to the forward wheel, and means operated by the pivotal movement of said bar for engaging or disengaging the clutch.

13. In a self-propelled vehicle having two road wheels in tandem, a stabilizing and control bar pivotally supported on an axis in line with the axis of the forward wheel, a motor associated with the forward wheel, driving connections for connecting the motor to the forward wheel, and means operated by the pivotal movement of said bar in positions accessible to the occupant of the vehicle for applying or releasing the brake.

14. A self-propelled vehicle having, in combination, two road wheels in tandem one of which is a combined traction and steering wheel, a motor, a rotatively mounted steering frame in common for supporting the motor and the combined traction and steering wheel, such frame having bearings for the motor in axial alinement with the axis of the combined steering and traction wheel, intermediate mechanism between the motor and the said traction wheel for varying the relative speed of the motor and the said traction wheel, and means for imparting steering movement to the said motor-supporting frame.

15. In combination, in a self-propelled vehicle, two road wheels in tandem of a relatively small diameter, a carrying platform extending between said wheels in close proximity to the plane of rolling contact of said wheels, and steering means connected with the front wheel, such steering means including an upwardly extending stabilizing bar rigid with respect to said front wheel in a vertical plane transverse to said front wheel and adapted to be operated by the occupant standing on the platform to actuate the steering means.

16. In combination, in a self-propelled vehicle, two road wheels of relatively small diameter, a carrying platform extending between the wheels and adapted to carry a person standing thereon, such platform having a level below the axis of one of the wheels, and a stabilizing bar operatively connected with the front wheel and having an operating handle, said bar extending to a position in which the operating handle thereof is accessible to the occupant standing erect on the platform.

17. In combination, in a self-propelled vehicle, a plurality of road wheels including front and rear wheels, a platform frame extending between the front and rear wheels, a motor for one of said wheels forming a driving wheel, means including a clutch for connecting the motor with the driving wheel, steering means connected with one of said wheels, said steering means including an articulated upwardly extending operating handle, and connections for controlling the clutch by the movement of said handle on its articulation and for steering the steering wheel by a different movement of said handle.

18. A self-propelled vehicle having, in combination, front and rear road wheels, a motor for one of said wheels forming a driving wheel, means including a clutch for connecting the motor with the driving wheel, a brake for the driving wheel, means for steering one of said wheels including a hinged upwardly extending bar, connections between said bar and the clutch for operating the clutch by movement of said bar on its hinge, and connections between said bar and the brake for operating the brake by movement of said bar on its hinge.

19. A self-propelled vehicle having, in combination, two road wheels in tandem, one of which is a steering wheel, a motor, driving connections for the motor with one of said wheels, such connections including a clutch, a hinged upright having rigid stabilizing connections connected to the steering wheel for steering and stabilizing, and clutch-controlling connections actuated by movement of said upright on its hinge.

20. A self-propelled vehicle having, in combination, two road wheels in tandem, one of said wheels being a steering wheel, a main frame for the vehicle, a steering frame carrying the steering wheel and pivotally mounted on the main frame, a motor for the steering wheel carried by the steering frame, and a fuel tank for the motor also carried by the steering frame.

21. A self-propelled vehicle having, in combination, front and rear road wheels, a motor for one of said wheels forming a driving wheel, means including a clutch for connecting the motor with the driving wheel, means for steering one of said wheels including a hinged steering and control bar, and connections between such bar and the clutch for controlling the clutch by movement of said bar on its hinge.

22. A self-propelled vehicle having, in combination front and rear road wheels, a motor for one of said wheels forming a driving wheel, a brake for one of said wheels, means for steering one of said wheels including a hinged steering and control bar, and connections between said bar and the brake for controlling the brake by movement of said bar on its hinge.

23. A self-propelled vehicle having, in combination, front and rear road wheels, a motor for one of said wheels forming a driving wheel, means for steering one of said wheels including a combined steering and control bar, and means for controlling the motor also including said bar, said bar being mounted to have one movement for steering and to have another movement for controlling the motor.

In testimony whereof, I have signed my name to this specification, in the presence of two subscribing witnesses, this 25th day of July, 1913.

ARTHUR HUGO CECIL GIBSON.

Witnesses:
   H. W. NICHOLS,
   H. MUCHMORE.